Oct. 30, 1934.　　　　F. M. KERN　　　　1,978,712
HONING TOOL
Filed March 9, 1931　　　2 Sheets-Sheet 2
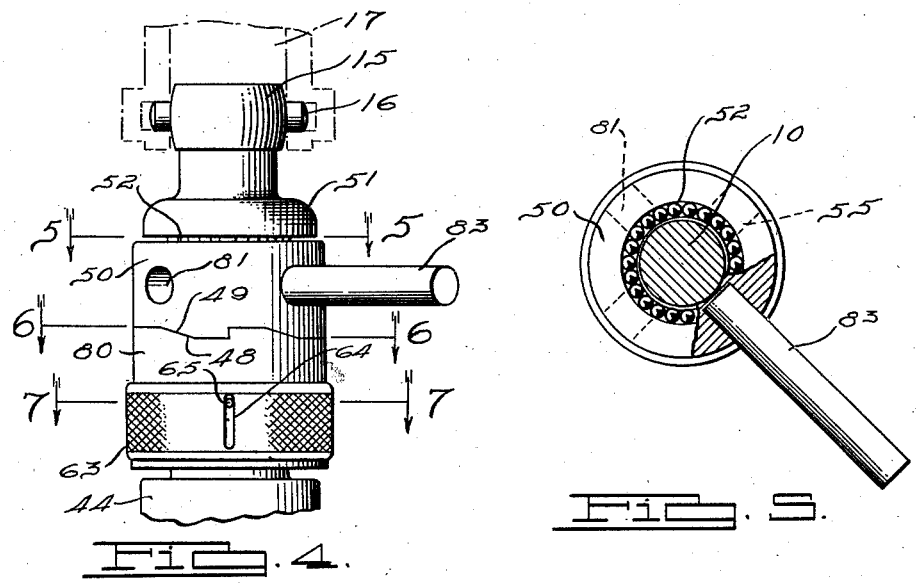
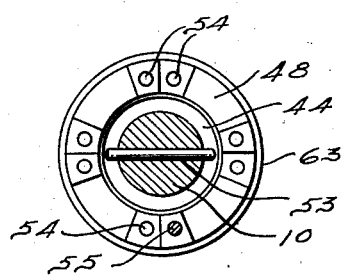
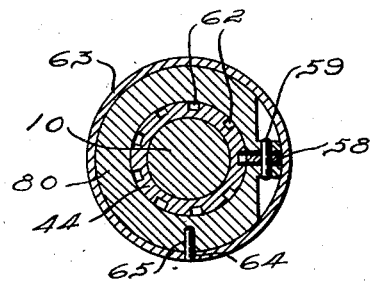
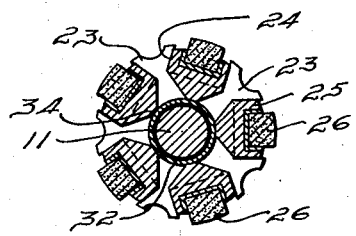
INVENTOR
Fred M. Kern.
BY
ATTORNEYS.

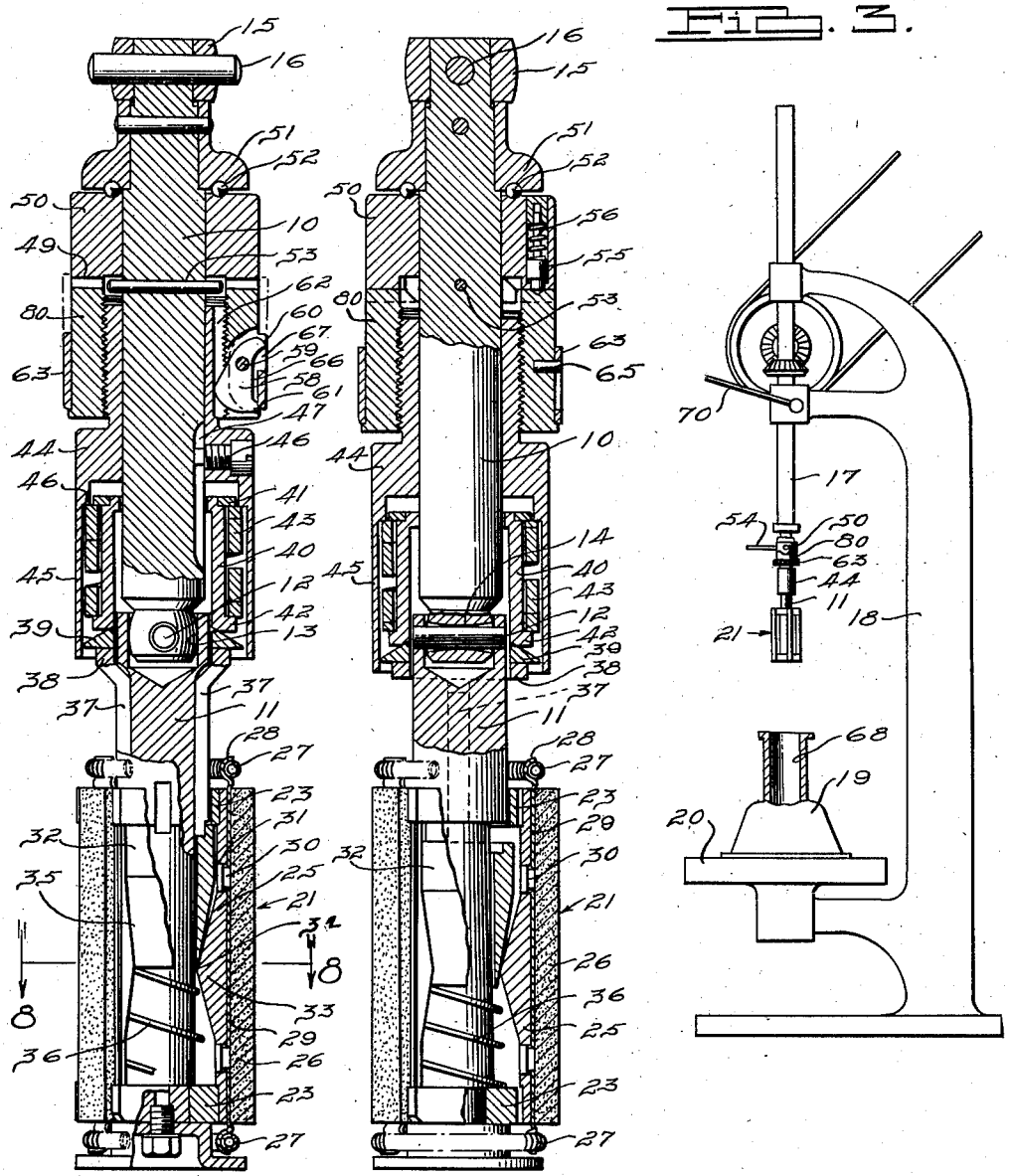

Patented Oct. 30, 1934

1,978,712

UNITED STATES PATENT OFFICE 1,978,712

HONING TOOL

Fred M. Kern, Detroit, Mich., assignor to Micromatic Hone Corporation, a corporation of Michigan Application March 9, 1931, Serial No. 521,091

14 Claims. (Cl. 51—184.2)

My invention relates to honing tools and particularly to an improved adjusting mechanism for the honing elements thereof and to the method of effecting a universal movement therebetween.

Heretofore, considerable difficulty was experienced in providing a freely movable universal connection on the spindle of the honing tool, between the honing elements and the adjusting head of the tool. This difficulty was caused by the presence of a heavy actuating spring in the vicinity of the joint which was biased between the head and the honing element. Means have been employed heretofore in conjunction with the springs, in the nature of cams or levers, for moving the spindle relative to the head in order to permit the collapse of the honing elements. The cams and levers extended beyond the outer surface of the head to be engaged by the cylinder wall or an associated member and thereby increased the overall width of the tool and prevented the operation of a battery of the tool when the cylinders were placed in close proximity to each other.

In practicing my invention, I provide a conical shaped washer upon which the spring cage rests in such manner as to engage the washer in a line contact which permits the cage to readily adjust itself in angular relation on the washer. In this construction the bias of the spring on the cage has very little influence in preventing the washer from freely moving relative to the cage and the lower body spindle is free to adjust itself relative to the top body spindle. I mounted an adjustable head directly on the upper portion of the top spindle which is provided with cam surfaces for engaging the cam surfaces on an adjustable indexing nut which, when revolved relative to each other, causes the head to move upwardly relative to the nut to draw the spindle upwardly therewith, for the purpose of collapsing the tool. In my construction the head is no larger in diameter than the overall dimension of the abrading elements of the tool which permits a plurality of the tool to be mounted contiguously to each other.

Accordingly one object of my invention is to provide a universal joint in the body portion of a honing tool which is freely adjustable to permit the centering of the abrading end of the tool in a cylinder.

Another object of my invention is to provide the adjustable head of a tool with a camming collar which may be rotated on a spindle relative to a fixed member for drawing the spindle longitudinally of the member.

A further object of my invention is to provide a honing tool in which the adjustable head, the biasing means and the honing end are of substantially the same diameter.

A still further object of my invention is to provide a honing tool of the above mentioned type, which is simple in construction, positive in operation and economical of manufacture.

Numerous other objects and features of novelty of my invention will be specifically pointed out or will become apparent when referring, for a better understanding of my invention, to the following description in conjunction with the accompanying drawings, wherein:

Figure 1 is a view, partly in section and partly in elevation, of a honing tool embodying features of my invention.

Fig. 2 is a view, partly in section and partly in elevation, of the honing tool shown in Fig. 1, taken 90 degrees therefrom with the honing elements in expanded position, Fig. 3 is an elevational view of a machine provided with my tool and a cylinder clamped thereon shown in section, Fig. 4 is a broken view, in elevation, of the honing tool shown in Figs. 1 and 2 in a position in which the honing elements are in collapsed position, Fig. 5 is a sectional view of the structure shown in Fig. 4, taken along the line 5—5 thereof, Fig. 6 is a sectional view of the structure shown in Fig. 4, taken along the line 6—6 thereof, Fig. 7 is a sectional view of the structure shown in Fig. 4, taken along the line 7—7 thereof, and Fig. 8 is a sectional view of the structure shown in Fig. 1, taken along the line 8—8 thereof.

Referring more particularly to Figs. 1 and 2, my honing tool is illustrated as comprising an upper spindle 10 and a lower spindle 11, which are joined for universal movement by the pin 12. The lower end of the upper spindle 10 is provided with arcuate sides which fit snugly within a recess provided in the upper end of the lower spindle 11. The hole 14, through the lower end of the upper spindle 10, is tapered at both ends as shown in Fig. 2, to permit the pin 12 to freely rock in the hole.

A collar 15 having arcuate sides, is provided on the upper end of the upper spindle 10, and is retained thereon by a pin 16 which is disposed normal to the pin 12. The pin and collar is engaged by the end of the shaft 17, as shown more clearly in Fig. 4 in dot and dash lines, which is supported on a machine 18. A cylinder block 19 is bolted, or otherwise secured, to a table 20 of the machine in alignment with the honing end 21 of the tool as shown in Fig. 3.

A pair of slotted spiders 23, shown more clearly in Fig. 8, is mounted in spaced fixed position on the lower spindle 11. The slots 24 thereof receive the holders 25 for the stones or honing element 26 which are retained in the slots by the garter springs 27 which encompass the fingers 28 projecting beyond the stones. The stones and the holder have been described and claimed in the co-pending application of F. J. Jeschke, Serial Number 289,370, filed June 30th, 1928 and assigned to the assignee of the present invention.

The holders are provided with pyramidal projections 33 which are engaged by a conical member 32 which is slidable on the spindle 11 and which is biased upwardly by a spring 36 away from the bottom of the tool. The slope of the cone and that of the sides of the pyramidal projection on the holder 25 are such as to effect a line engagement therebetween, as shown in Fig. 2. Fingers 37 project downwardly along the side of the lower spindle 11 from an annular ring 38 with which they are integral and through which movement is transmitted to the conical member 32.

A conical shaped washer 39 is mounted upon the upper surfaces of the ring 38, and is engaged by the lower surface of a spring cage 40 which retains a relatively heavy spring 43 under initial compression between the flanges 41 and 42 of the cage.

A sleeve 44 is slidably mounted on the upper spindle 10 which is provided on its lower end with a skirt 45 extending over the spring cage 40 for effecting its complete enclosure. The junction between the skirt 45 and the body portion of the sleeve, forms a shoulder 46 which engages the upper end of the spring 43.

The sleeve 44 is retained on the spindle 10 against rotation by a nut 46 having a projecting end which is recessed within a slot 47. The upper end of the sleeve 44 is provided with a reduced threaded portion upon which a nut 80 is screwed for the purpose of adjusting the downward thrust of the sleeve. The upper end of the nut 80 is provided with sloping camming surfaces 48 which register with similar camming surfaces 49 on a collar 50 which is mounted for rotation on the spindle 10.

A collar 51 is mounted in fixed relation on the upper end of the spindle 10 by a pin, as shown in Figs 1 and 2, the upper portion of the collar 51 abutting against the collar 15 which assists in preventing the upward movement of the collar 51. A plurality of balls 52 are provided between the collars 50 and 51 for reducing the friction therebetween to permit the collar 50 to be easily revolved upon the spindle 10. A pin 53 is employed to prevent the downward movement of the collar 50 relative to the spindle.

A plurality of recesses 54 are disposed between the sloping surfaces 48 of the nut 80, in which a plunger 55 in the collar 50, is biased by a spring 56. The engagement of the plunger 55 with a recess, positions the collar relative to the nut 80 and requires a positive force to be applied to the collar to move it from camming, to retracted position. A plurality of recesses 81 are disposed radially in the collar 50 for the purpose of receiving one end of an actuating handle 83 which is insertable within a recess for the purpose of revolving the collar 50 on the spindle 10. After the collar has been moved relative to the nut 80 the handle 83 is then removed before the tool is rotated.

To prevent the rotation of the nut 80 on the threaded end of the sleeve 44 when the sleeve 50 is revolved, I have provided a positive locking arrangement which includes a cam 58 which is pivotally mounted on a pin 59 in the body portion of the nut 80. A camming end 60 is provided on the upper portion of the cam 58 for the purpose of rotating the cam counter clockwise. A similar camming surface 61 is provided below the pivot 59 for the purpose of rotating the cam clockwise into nut latching position. A plurality of grooves 62 are provided about the periphery of the threaded end of the sleeve 44, as shown in Fig. 7 in which the cam registers to prevent the rotation of the nut 80.

A sleeve 63 is mounted on the lower portion of the nut 80 and is retained thereon by a pin 65 which extends through a slot 64 in the sleeve to limit the movement of the sleeve on the nut. When the sleeve 63 is in its downward position relative to nut 80, the inner surface thereof engages the camming end 61 of the cam 58 to force the cam inward into a recess 62 and to retain the cam in latched position.

When the nut is to be rotated to effect the adjustment of the tool, the sleeve 63 is slid upwardly, the camming surface 60 registers with the slot 67 therein, until the camming end 61 is released, after which the lower portion of the slot engages the cam surface to cause the cam to be rotated counter-clockwise and to thereby be moved out of the slot 62. After the nut has been rotated and the desired adjustment made the cam is moved adjacent to a slot 62 and the sleeve 63 is moved downwardly on the nut 80 to cause a clockwise movement of the cam into a recess 62 to thereby positively lock the nut 80 on the sleeve 44.

The operation of my honing tool will now be described. Assuming a cylinder 68, as shown in Fig. 3, is to be honed the tool is inserted therein when the stones are in collapsed position, as shown in Fig. 1, in which position the collar 50 and the nut 80 are relatively positioned, as shown in Fig. 4. The handle 83 is then inserted in a recess 81 of the collar 50 and the collar is turned relative to the nut to expand the honing elements 26. The sleeve 63 is moved upwardly on the nut to retract the cam 58 from the notch 62 and the nut is rotated until the stones engage the cylinder wall. The handle 83 is again inserted within a recess 81 in the collar 50 and the collar is revolved a quarter turn to retracted position, as shown in Fig. 4. The nut 80 is again adjusted, being turned one notch for each predetermined number of units the cylinder must be honed to effect a predetermined diameter.

After the adjustment is thus made the handle 83 is again inserted in the recess 81 of the collar and the collar is revolved a quarter of a turn to force the nut 80 and the sleeve 44 downwardly a predetermined amount. The machine 18 is then operated to have the spindle 17 and the honing tool rotated at a predetermined rate and a reciprocating motion is applied by the handle 70, to the honing tool to effect the honing of the cylinder.

The wall of the cylinder 68 will be cut away by the stones as they continue to expand under the bias of the spring 43 until the upper portion of the spring 43 engages the flange 41 of the cage at which time the bias of the spring is entirely removed from the fingers 37 and therefore to the honing element 26. A micrometer reading may then be taken of the cylinder and, if not of sufficient diameter, the tool is again collapsed and a predetermined number of notches are passed over by the cam 58 as the nut is turned a predetermined amount and after the cam engages the proper slot and the sleeve 63 is moved thereover, the collar 50 is again rotated a quarter turn to expand the hone within the cylinder.

After the cylinder is honed to the proper size, no further adjustment of the honing element need be made, while other cylinders, having similar diameters, are honed by the tool, except for occasional adjustment because of the wear of the stones. During the honing operation the lower spindle 11 may adjust itself within the cylinder 68 relative to the spindle 10 because of the universal joint provided by the pin 14. The freedom of movement of the joint is only slightly impaired by the adjusting mechanism because of the sloping washer 39 which engages the lower surface of the spring cage 40 and because of the clearance provided between the spring cage and the upper portion of the spindle 11. With my construction, the honing element is permitted to follow the bore of the cylinder irrespective of whether or not the shaft 17 is in slightly off-center relative to the bore. During the operation, the nut 80 is positively locked to the sleeve 44 by the cam 58 and the collar 50 is positively locked in position on the nut 80 by the plunger 55 and the recesses 54, in one of which the plunger registers and during the rotation of the hone the various members will be prevented from moving relatively to each other.

It will thus be seen, that I have provided a tool in which the overall diameter is substantially the same throughout the length of the tool, permitting the close positioning of the tools when a plurality of adjacent cylinders are to be honed at the same time. I have provided a conical washer, adjacent to the universal joint between the spindle, upon which the spring cage adjustably rests, and permits the lower spindle to move relative to the upper spindle with comparative ease. By providing locking engagement between the adjusting collar and the nut and between the nut and the sleeve, the various elements of my tool are retained in predetermined position at all times during the honing operation.

While I have described and illustrated but a single embodiment of my invention, it will be apparent to anyone skilled in the art that various changes, omissions, additions and substitutions may be made therein without department from the spirit and scope of my invention, as set forth in the accompanying claims.

I claim:

1. A honing tool including in combination, a spindle, expansible elements mounted thereon, means for adjusting the expansion of said elements including a slotted sleeve slidably mounted on said spindle, a nut threaded on the sleeve for effecting its extension, said nut being provided with camming surfaces by which said sleeve and nut are longitudinally moved on the spindle and a cam pivotally mounted in the body portion of said nut for locking engagement with said slot.

2. A honing tool including in combination, a spindle, expansible elements mounted thereon, means for adjusting the expansion of said elements including a slotted sleeve slidably mounted on said spindle, a nut threaded on the sleeve for effecting its extension, a member having a slot engaging portion and two camming portions, pivotally mounted on said nut and means for engaging and actuating either camming surface and for retaining the slot engaging portion in the position to which it was last actuated.

3. A honing tool including in combination, a spindle, expansible elements mounted thereon, means for adjusting the expansion of said elements including a slotted sleeve slidably mounted on said spindle, a nut threaded on the sleeve for effecting its extension, a cam pivotally mounted in the body portion of said nut for locking engagement with said slot and a sleeve slidably mounted on said nut for actuating said cam to nut-locked and to nut-unlocked position and for retaining the cam in either of said positions.

4. A honing tool including in combination, a spindle supporting expansible abrading elements, a sleeve slidably mounted on said spindle for controlling the actuation of said elements, a nut threaded on said sleeve and provided with camming surfaces on one of its ends, a collar revolvably mounted on said spindle in camming engagement with the first said camming surfaces and means for locking the nut on said sleeve.

5. A honing tool including in combination, a spindle supporting expansible abrading elements, a sleeve slidably mounted on said spindle for controlling the actuation of said elements, a nut threaded on said sleeve and provided with camming surfaces on one of its ends, a collar revolvably mounted on said spindle in camming engagement with the first said camming surfaces, means for locking said camming surfaces in cammed position and means for locking said nut on said sleeve.

6. A honing tool including, in combination, a spindle connected for universal movement medially of its length, a plurality of abrading elements on the lower portion of said spindle which are movable radially thereof, means for moving said elements, an actuating member engaging said means for effecting said movement, spring means encompassing said connection for applying a bias to said member, and a conical member between said spring means and said member upon which said spring means is freely adjustable for universal movement.

7. A honing tool including, in combination, an adjusting head having a universal connection with a grinding body which is provided with a plurality of abrading elements and which is mounted in extension of said head, an actuating member for adjusting said elements radially in said body, means encompassing said connection for applying a bias to said actuating member, and a conical member upon which said means is freely adjustable for universal movement.

8. A honing tool including, in combination, an adjusting head having universal connection with a grinding body which is provided with a plurality of abrading elements, an actuating member for adjusting said elements radially in said body, a spring and cage encompassing said connection for transferring a bias to said actuating member, and means upon which said cage is freely adjustable for universal movement.

9. In an abrading tool, a spindle, radially adjustable abrading elements movable laterally thereof, a sleeve slidable on said spindle, an adjustable member mounted on and movable longitudinally of said sleeve, said member having camming surfaces on one end, and a collar on said spindle having camming surfaces on one end complementary to said first surfaces and adjustable to move said member and sleeve longitudinally of said spindle.

10. In an abrading tool, a spindle, radially adjustable abrading elements movable laterally thereof, a sleeve slidable on said spindle, a spring disposed between said sleeve and the abrading elements, an adjustable member mounted on and movable longitudinally of said sleeve, said member having camming surfaces on one end, and a collar on said spindle having camming surfaces on one end complementary to said first surfaces and adjustable to move said member and sleeve longitudinally of said spindle.

11. In an abrading tool, a spindle, radially adjustable abrading elements movable laterally thereof, a threaded sleeve slidable on said spindle, an adjustable member threaded on said sleeve and positionable relative thereto, said member having camming surfaces on one end, and a collar on said spindle having camming surfaces on one end complementary to said first surfaces and adjustable to move said member and sleeve longitudinally of said spindle.

12. In an abrading tool, a spindle, radially adjustable abrading elements movable laterally thereof, a threaded sleeve slidable on said spindle, an adjustable member threaded on said sleeve and positionable relative thereto, said member having camming surfaces on one end, a collar on said spindle having camming surfaces on one end complementary to said first surfaces and rotatable to move said member and sleeve longitudinally of said spindle through the action of said camming surfaces, and means for retaining said collar in rotated position.

13. In an abrading tool, a spindle, radially adjustable abrading elements movable laterally thereof, a threaded sleeve slidable on said spindle, a member threaded on said sleeve and adjustable relative thereto, means for retaining said member in adjusted position, said member having camming surfaces on one end, and a collar on said spindle having camming surfaces on one end complementary to said first surfaces and adjustable to move said member and sleeve longitudinally of said spindle.

14. In an abrading tool, a spindle, radially adjustable abrading elements movable laterally thereof, a threaded sleeve slidable on said spindle, a member threaded on said sleeve for adjustment relative thereto, means for retaining said member in adjusted position, said member having camming surfaces on one end, a collar on said spindle having camming surfaces on one end complementary to said first surfaces and revolvable to move said member and sleeve longitudinally of said spindle through the action of said camming surfaces, and means for positioning said collar.

FRED M. KERN.